(12) United States Patent
Luyendijk

(10) Patent No.: US 9,162,297 B2
(45) Date of Patent: Oct. 20, 2015

(54) HYDRAULIC DEVICE FOR HYDRAULIC CYLINDERS

(75) Inventor: Joost Luyendijk, Heesh (NL)

(73) Assignee: Caterpillar Work Tools B.V., s-Hertogenbosch (NL)

( * ) Notice: Subject to any disclaimer, the term of this patent is extended or adjusted under 35 U.S.C. 154(b) by 648 days.

(21) Appl. No.: 13/512,546

(22) PCT Filed: Nov. 26, 2010

(86) PCT No.: PCT/EP2010/068337
§ 371 (c)(1),
(2), (4) Date: Dec. 4, 2012

(87) PCT Pub. No.: WO2011/064344
PCT Pub. Date: Jun. 3, 2011

(65) Prior Publication Data
US 2013/0068090 A1    Mar. 21, 2013

(30) Foreign Application Priority Data

Nov. 30, 2009 (EP) .................................... 09177513
Dec. 4, 2009 (EP) .................................... 09178089

(51) Int. Cl.
*B23D 31/00* (2006.01)
*F15B 11/02* (2006.01)
(Continued)

(52) U.S. Cl.
CPC .............. *B23D 31/00* (2013.01); *F15B 11/022* (2013.01); *F15B 11/0325* (2013.01); *F15B 15/14* (2013.01); *F15B 21/082* (2013.01); *G01V 3/30* (2013.01)

(58) Field of Classification Search
CPC .... F15B 11/022; F15B 11/0325; F15B 15/04; F15B 21/082
USPC .......................................................... 91/436
See application file for complete search history.

(56) References Cited

U.S. PATENT DOCUMENTS 2,800,110 A    7/1957    Haarmeyer
4,836,088 A    6/1989    Seabaugh
(Continued)

FOREIGN PATENT DOCUMENTS

CN    2031859 U    2/1989
CN    1137246 A    12/1996
(Continued)

OTHER PUBLICATIONS

International Search Report, PCT/EP2010/068337, filed Nov. 26, 2010, 5 pp.

*Primary Examiner* — Thomas E Lazo
(74) *Attorney, Agent, or Firm* — Finnegan, Henderson, Farabow, Garrett & Dunner, LLP

(57) ABSTRACT

A method of operating a dual acting hydraulic cylinder comprising the steps of returning a hydraulic fluid from a rod-side chamber to a piston-side chamber of the cylinder during a start phase of cylinder extraction with a speed component and increasing pressure of the fluid during end phase of cylinder extraction with a booster component and permitting the fluid to flow from the rod-side chamber to a reservoir. A hydraulic device for operating a dual acting hydraulic cylinder comprising a speed component arranged to return a hydraulic fluid from a rod-side chamber to a piston-side chamber of the cylinder at a start phase of cylinder extraction and a booster component arranged to increase the pressure of the fluid at an end phase of cylinder extraction.

20 Claims, 3 Drawing Sheets

(51) Int. Cl.
*F15B 11/032* (2006.01)
*F15B 21/08* (2006.01)
*F15B 15/14* (2006.01)
*G01V 3/30* (2006.01)

(56) References Cited

U.S. PATENT DOCUMENTS

| | | | |
|---|---|---|---|
| 4,913,616 A | 4/1990 | Dunn | |
| 5,061,175 A | 10/1991 | Iwamoto | |
| 5,415,076 A | 5/1995 | Krone et al. | |
| 5,419,236 A | 5/1995 | Plettner | |
| 5,542,180 A * | 8/1996 | Karani | 30/134 |
| 5,996,465 A | 12/1999 | Morikawa et al. | |
| 7,040,214 B2 * | 5/2006 | Cossette et al. | 91/420 |
| 7,540,231 B2 | 6/2009 | Hofmann et al. | |

FOREIGN PATENT DOCUMENTS

| | | |
|---|---|---|
| DE | 197 21 759 A1 | 5/1997 |
| DE | 29723585 U1 | 12/1998 |
| EP | 0 376 143 A2 | 10/1989 |
| GB | 2 167 706 A | 6/1986 |
| JP | 63-72904 A | 4/1988 |
| JP | 2005-42807 A | 2/2005 |
| WO | WO 2011/064344 A1 | 6/2011 |

* cited by examiner

HYDRAULIC DEVICE FOR HYDRAULIC CYLINDERS

CROSS REFERENCE TO RELATED APPLICATION

This application is a national phase application based on PCT/EP2010/068337, filed Nov. 26, 2010, and claims the priority of European Patent Application Number 09178089.0, filed Dec. 4, 2009, and European Patent Application Number 09177513.0, filed Nov. 30, 2009, all of which are incorporated herein by reference.

TECHNICAL FIELD

This disclosure relates to a hydraulic device for operation of a piston/cylinder assembly such as a dual acting hydraulic cylinder and to a method of cyclically operating a dual acting hydraulic cylinder. More particularly, this disclosure relates to cyclic operation of a dual acting hydraulic cylinder in a demolition machine.

BACKGROUND

A hydraulic cylinder is a mechanical actuator which may be used to give a linear force. The hydraulic cylinder may have varied applications and may be used in engineering vehicles and machines for example a demolition tool, which comprises of a jaw set that may be opened and closed by actuation of a hydraulic cylinder.

Hydraulic pressure from a pressurized fluid, such as oil, acts on the piston to perform linear work. Pressurized fluid may flow between a reservoir and the base side or rod side chambers of the hydraulic cylinder for cyclic operation thereof. Generally, flow of pressurized oil into the base side chamber may affect an extraction of the piston rod while flow of oil into the rod side chamber may affect retraction of the piston rod. Cycle time to extract or retract the piston rod may be dependent on multiple factors such as size of the cylinder. In certain engineering activities a reduction of the cycle time may be desired.

The cycle time of a hydraulic cylinder may be reduced by use of a speed valve or a regeneration valve.

U.S. Pat. No. 5,996,465 describes an oil-pressure cylinder in a crushing device connected to a crushing jaw to actuate the crushing jaw. Cylinder extension may cause the crushing jaw to close and crush an object. During a jaw closing stroke as the crushing jaw starts to close, to the point the crushing jaw comes into contact with the object, an acceleration (speed or regeneration valve) valve may make a continuous communication between a base-side port and a rod-side port in the cylinder. Oil from the rod-side port may be made to flow to the base-side port which may increase the movement-speed of the rod in the jaw closing stroke during the unloaded interval. When the crushing jaw comes into contact with the object, communication of the base-side port to the rod-side port is interrupted.

U.S. Pat. No. 7,540,231 describes a control valve device for the control of a dual-action consumer. A regeneration function allows the return side of the consumer to be connected with the admission side of the consumer. For the regeneration function, the connection of an additional pressure fluid line that forms the return side of the consumer with the reservoir can be blocked by a shutoff valve device located between the consumer and the control valve. The regeneration function may be overridden by an actuation of the shutoff valve device toward the open position as a function of the admission pressure at the admission side of the consumer. Under operating conditions wherein a high admission pressure is necessary to achieve high output power or increased performance, the regeneration function may be deactivated by the overriding of the regeneration function to ensure that the regeneration function is active only to achieve an increased speed of movement of the consumer.

Although the time to extract the piston rod may be increased, the aforementioned speed valves have a disadvantage in that the time to retract the piston rod is relatively long.

U.S. Pat. No. 5,542,180 describes a heavy duty shear comprising a fixed lower jaw and a movable upper jaw driven by a hydraulic cylinder. To overcome jams, the hydraulic cylinder is provided with an intensifier which pressurizes a portion of hydraulic fluid above the maximum pressure of the machine hydraulic system. The hydraulic fluid at a higher pressure is provided to the cylinder to facilitate opening of the jaws. The output pressure of the intensifier is selected to overcome the difference in the area at the rod side of the piston and area at the piston side of the piston.

The high pressure to open the jaw may be present only when a jam is to be cleared.

U.S. Pat. No. 5,415,076 describes fluid regeneration circuits which may be useful for filling expanding sides of a hydraulic cylinder with fluid being exhausted from the other side. A flow regeneration valve and a pressure boost valve may be used in combination with a meter-out valve for providing flow regeneration from the head end chamber to a rod end chamber when fluid pressure in the head end chamber is less than the pressure level of fluid in a passage as determined by a spring of the pressure boost valve. The pressure boost valve may be disposed within the passage and may be oriented to block fluid flow from the exhaust conduit to the inlet of the meter-out valve. The boost valve is biased to the closed position by the spring to block fluid flow from the inlet to the exhaust conduit until the fluid pressure in the inlet exceeds a predetermined level.

The pressure boost valve may be involved with control of fluid flowing to the tank and may not be involved in improving cycle time of the hydraulic cylinder.

The present disclosure is directed, at least in part, to improving or overcoming one or more aspects of the prior art system.

BRIEF SUMMARY OF THE INVENTION

In a first aspect, the present disclosure provides a method of operating a dual acting hydraulic cylinder comprising the steps of returning a hydraulic fluid from a rod-side chamber to a piston-side chamber of the cylinder during a start phase of cylinder extraction with a speed component and increasing pressure of the fluid during end phase of cylinder extraction with a booster component and permitting the fluid to flow from the rod-side chamber to a reservoir. In a second aspect, the present disclosure provides a hydraulic device for operating a dual acting hydraulic cylinder comprising a speed component arranged to return a hydraulic fluid from a rod-side chamber to a piston-side chamber of the cylinder at a start phase of cylinder extraction and a booster component arranged to increase the pressure of the fluid at an end phase of cylinder extraction.

Other features and advantages of the present disclosure will be apparent from the following description of various embodiments, when read together with the accompanying drawings.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

This disclosure generally relates to a hydraulic device 10 for operating a piston/cylinder assembly such as a hydraulic cylinder, in particular a dual acting hydraulic cylinder.

Figure 1:
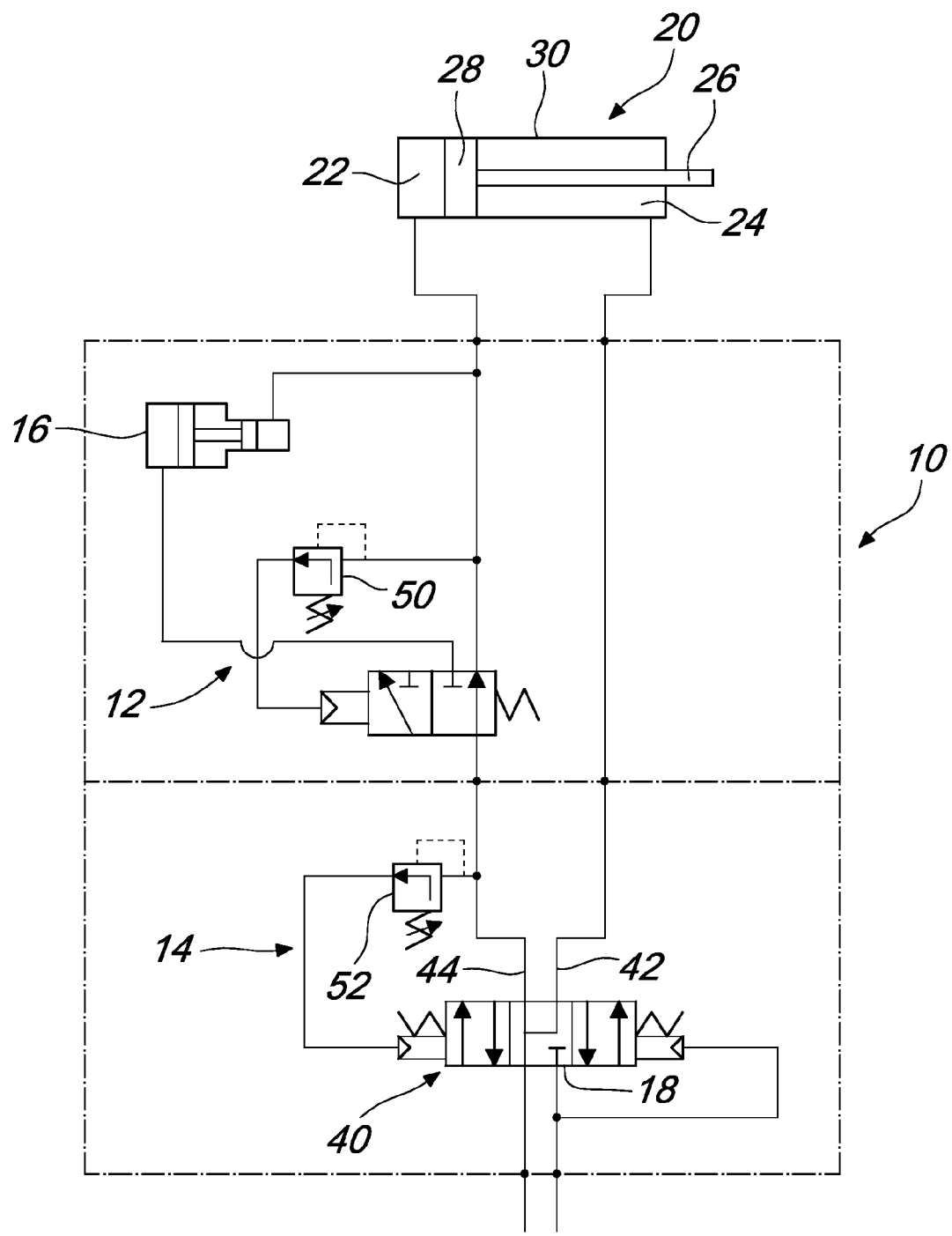
FIG. 1 is a schematic representation of a first embodiment of the hydraulic device according to the present disclosure coupled to a hydraulic cylinder.

FIG. 1 shows a schematic representation of hydraulic connections between the hydraulic device 10 and a hydraulic cylinder 20 in a first embodiment. The hydraulic connections may be suitably provided for operation and control of the hydraulic device 10 and the hydraulic cylinder 20. Operation of the hydraulic device 10 and the hydraulic cylinder 20 may be affected through pressurization of the hydraulic fluid.

The hydraulic device 10 may comprise of a booster component 12, a speed component 14 and a distributor 40.

The distributor 40 may control flow of hydraulic fluid to and from a reservoir and lines connecting the hydraulic device 10 and the hydraulic cylinder 20. The booster component 12 may comprise of a booster valve 16 and the speed component 14 may comprise of a regeneration valve. In an embodiment the regeneration valve 18 may be comprised within the distributor 40.

The booster component 12 and the speed component 14 may also comprise sequence valves 50, 52 for pressure controlled activation or deactivation of the components. In an embodiment, the hydraulic connections may be arranged to activate or deactivate the booster component 12 and the speed component 14 in sequence. The hydraulic cylinder 20 may be under the speed mode when the speed component 14 is activated and may be under the boost mode when the booster component 12 is activated.

The hydraulic cylinder 20 may comprise of a piston-side chamber 22, a rod-side chamber 24, a rod 26, a piston 28 and a cylinder body 30. The hydraulic cylinder 20 may go through cylinder extraction or extraction stroke, when the rod 26 may move out from cylinder body 30, and cylinder retraction or retraction stroke, when the rod 26 may move into cylinder body 30. Hydraulic lines may be connected to the cylinder body 30 for passage of fluid into the piston-side chamber 22 and the rod-side chamber 24.

For cylinder retraction, the distributor 40 may pump hydraulic fluid from a fluid reservoir to rod-side chamber 24 through line 42 while fluid from the piston-side chamber 22 may be allowed to return to the reservoir through the line 44.

The booster component 12 and the speed component 14 may be arranged to remain inactive during cylinder retraction regardless of the hydraulic pressure acting on sequence valves 50, 52.

For cylinder extraction, the distributor 40 may pump hydraulic fluid from a fluid reservoir to piston-side chamber 22 through lines 44 while fluid from the rod-side chamber 24 may be allowed to return to the reservoir through the lines 42.

The speed component 14 may be arranged to be activated during the extraction stroke upon flow of hydraulic fluid into line 44. The speed component 14 may be arranged to be deactivated during the extraction stroke if the hydraulic pressure acting on sequence valve 52 exceeds a predetermined pressure. Thereafter, the speed component 14 may be arranged to be re-activated during the extraction stroke if the hydraulic pressure acting on sequence valve 52 falls below a predetermined pressure. In an embodiment the activation and deactivation pressures of the sequence valve 52 in speed component 14 may be the same.

The booster component 12 may be arranged to be activated during the extraction stroke if pressure acting on sequence valve 50 exceeds a predetermined pressure and may be deactivated if the pressure acting on sequence valve 50 falls below a predetermined pressure. In an embodiment the activation and deactivation pressures of the sequence valve 50 in the booster component 12 may be the same.

Figure 2:
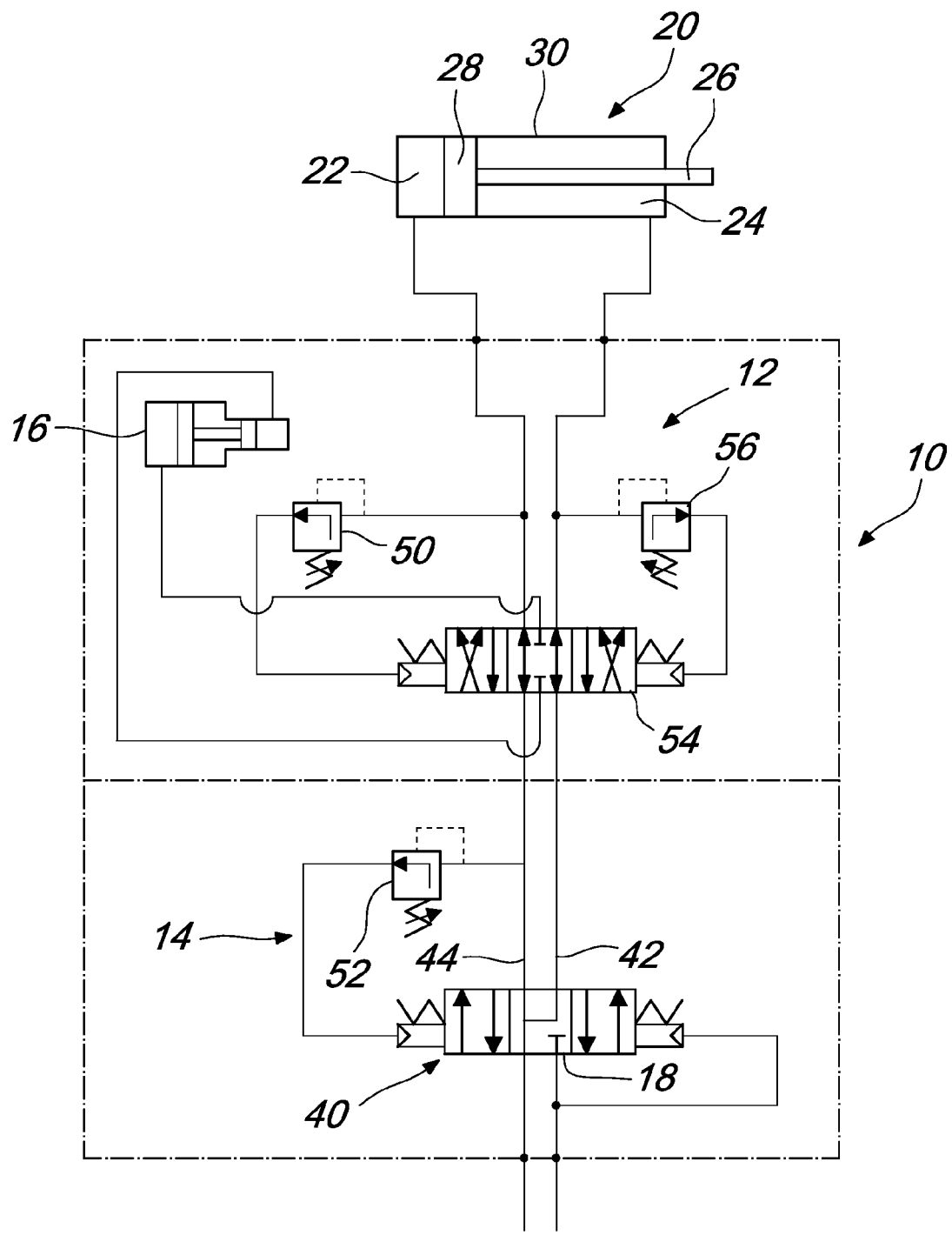
FIG. 2 is a schematic representation of a second embodiment of the hydraulic device according to the present disclosure coupled to a hydraulic cylinder.

FIG. 2 shows a schematic representation of hydraulic connections between the hydraulic device 10 and the hydraulic cylinder 20 in a second embodiment.

In the second embodiment, the booster component 12 may comprise the booster valve 16, the sequence valve 50, a diversion valve 54 and an additional sequence valve 56.

The booster component 12 may be arranged for activation and deactivation during both the extraction and the retraction stroke. The hydraulic device 10 may have additional hydraulic connections to the hydraulic cylinder 20. Booster component 12 may be connected through hydraulic lines 42, 44 to both the piston-side chamber 22 and the rod-side chamber 24. The booster component 12 may be connected to the hydraulic lines 42, 44 through a diversion valve 54. The diversion valve 54 may be arranged to divert the flow of hydraulic fluid from either the piston-side chamber 22 or the rod-side chamber 24 of the hydraulic cylinder 20 through the booster component 12 in accordance with an extraction stroke or a retraction stroke.

The diversion valve 54 may be arranged to divert the flow of hydraulic fluid from the rod-side chamber 24 through the booster component 12 during retraction stroke. The diversion valve 54 may be arranged to divert the flow of hydraulic fluid from the piston-side chamber 22 through the booster component 12 during the extraction stroke.

For cylinder retraction, the distributor 40 may pump hydraulic fluid from a fluid reservoir to rod-side chamber 24 through line 42 while fluid from the piston-side chamber 22 may be allowed to return to the reservoir through the line 44. The booster component 12 may be arranged to be activated during the retraction stroke if pressure acting on sequence valve 56 exceeds a predetermined pressure. The booster component 12 may be arranged to be deactivated during the retraction stoke if pressure acting on sequence valve 56 falls below a predetermined pressure. In an embodiment the activation and deactivation pressures of the sequence valve 56 in booster component 12 may be the same.

For cylinder extraction, the distributor 40 may pump hydraulic fluid from a fluid reservoir to piston-side chamber 22 through lines 44 while fluid from the rod-side chamber 24 may be allowed to return to the reservoir through the lines 42. The booster component 12 may be arranged to be activated during the extraction stroke if pressure acting on sequence valve 50 exceeds a predetermined pressure and may be deactivated if the pressure acting on sequence valve 50 falls below a predetermined pressure. In an embodiment the activation and deactivation pressures of the sequence valve 50 in the booster component 12 may be the same.

The speed component 14 may function as described in the first embodiment.

The hydraulic device 10 may engage the hydraulic cylinder 20 through an operation cycle thereof. A cycle of the hydraulic cylinder 20 may comprise of an extension stroke and a retraction stroke. The retraction stroke of the hydraulic cylinder 20, coupled to the hydraulic device 10, may have a single phase with a high retraction speed. The speed component 14 and the booster component 12 of the hydraulic device 10 may be inactive during the retraction stroke of the hydraulic cylinder 20.

In an embodiment the booster component 12 may become active during the retraction stroke, if a jam occurs during the stroke. Activation of the booster component 12 may decrease retraction speed. Upon clearance of the jam, the booster component 12 may be deactivated thereby increasing the retraction speed. During the retraction stroke the hydraulic cylinder 20 may not be subject to a load.

In an embodiment, the hydraulic cylinder 20 incorporated with a hydraulic device 10 may have a 3 phase extraction stroke when subjected to a load.

In the first phase, the speed component 14 of the hydraulic device 10 may be activated and the booster component 12 may remain inactive. The hydraulic cylinder 20 may be under the speed mode and may have a high extraction speed combined with low force output. During the first phase, the hydraulic cylinder 20 may not yet be subjected to the load.

In the second phase, the speed component 14 of the hydraulic device 10 may be deactivated and the booster component 12 may be inactive. The hydraulic cylinder 20 may have a medium extraction speed combined with a medium force output. During the second phase the hydraulic cylinder 20 may be subjected to the load.

In the third phase, the booster component 12 of the hydraulic device 10 may be activated while the speed component 14 may be inactive. The hydraulic cylinder 20 may have a low extraction speed and a high force output. During the third phase the hydraulic cylinder 20 may be subjected to a higher load. The booster component 12 may be deactivated if the pressure within the circuit falls below a predetermined pressure.

The respective times of each of the phase and sequence of the phases may be dependent on the load of the hydraulic cylinder 20.

A 3 phase extraction may allow the hydraulic cylinder 20 to adapt suitably to requirements of a work application which may result in a more effective load cycle. Depending on the requirement of the work application the booster component 12 or the speed component 14 may be active or inactive in order to deal with the circumstances. The speed component 14 may be activated during cylinder extraction if no load is required. The booster component 12 may be activated or deactivated during cylinder extraction depending on the required force output. The booster component 12 and the speed component 14 may also be both inactive which may provide an effective operational mode with the least loss of energy. The switching capability allows for the right amount of force output to be provided as required by the momentary work requirement.

In certain work applications, the hydraulic device 10 may enable a 2 phase extension stroke of the hydraulic cylinder 20, when subjected to a load, wherein the first phase is followed immediately by the third phase. A 2 phase extension stroke of the hydraulic cylinder 20 may occur when the hydraulic cylinder 20 is subjected to a very high load.

The transition between the phases may occur as a function of pressure changes within the hydraulic device 10. Hydraulic pressure within the hydraulic device 10 may affect activation and deactivation of the speed component 14 and booster component 12 during the extraction stroke and retraction stroke of the hydraulic cylinder 10. In an alternative embodiment, the transition between the phases may occur as a function of pressure and as a change in direction of the hydraulic fluid flow within the hydraulic device 10.

The hydraulic device 10 may provide for a short cycle time for a hydraulic cylinder 20 coupled thereto by decreasing the time needed for cylinder retraction and by decreasing the time needed for cylinder extraction. Cylinder retraction time may be reduced by the booster component 12 by limiting the size of the hydraulic cylinder 20. Cylinder extraction time may be reduced by the speed component 14.

Figure 3:
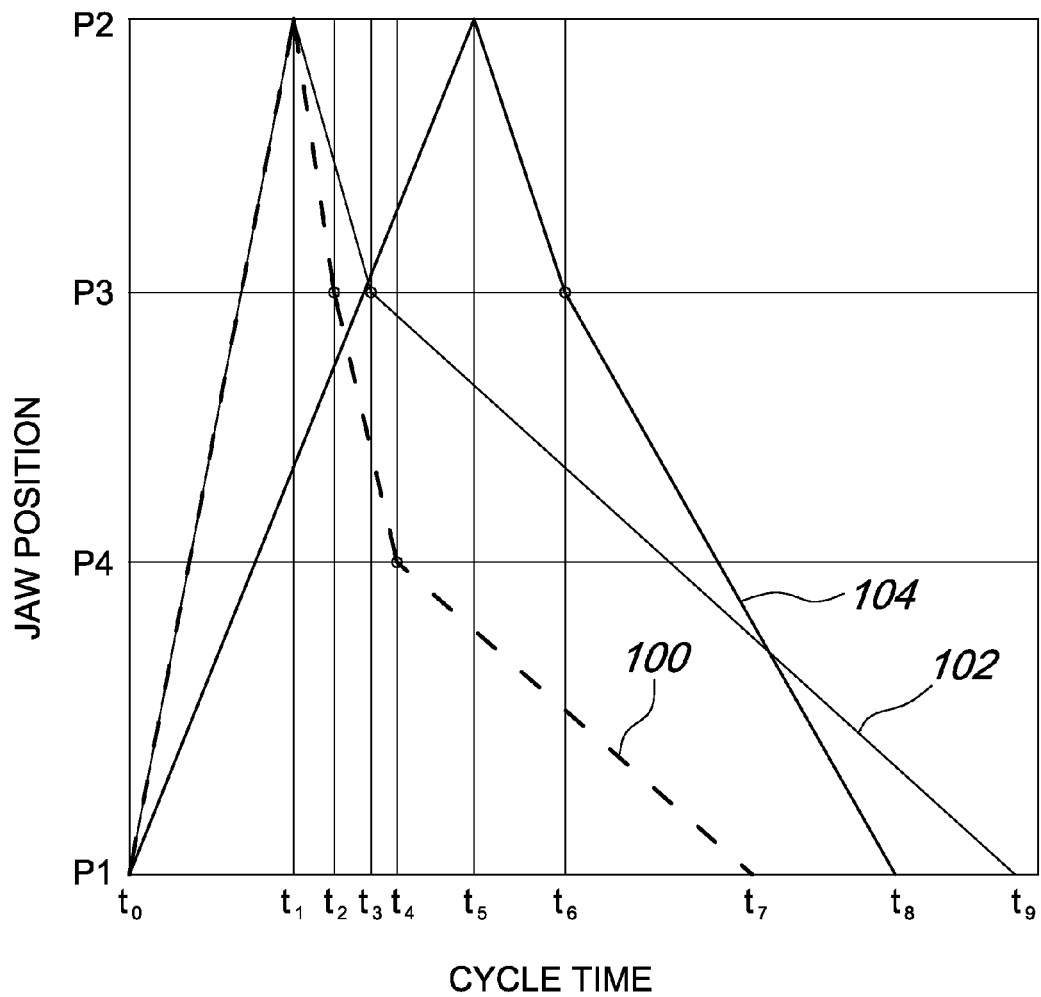
FIG. 3 is a comparative graph of cycle times of jaw sets of demolition tools during a demolition application where the cycle time of the jaw set actuated by a hydraulic cylinder coupled to an embodiment of the hydraulic device according to the present disclosure is compared to the cycle times of jaw sets actuated by hydraulic cylinders coupled to a speed valve and a boost valve.

FIG. 3 is a comparative graph of jaw set cycle times of demolition tools during a demolition application. The jaw set of the demolition tool may open to enable material to be introduced therein. To crush, cut, pulverize or otherwise work the material, the jaw set may close with the material contained therein.

The cycle time of the jaw set actuated by a hydraulic cylinder 20 coupled to an embodiment of the hydraulic device 10 is shown as line 100. The cycle time of a jaw set actuated by a hydraulic cylinder coupled to a boost valve is shown as 102. The cycle time of a jaw set actuated by a hydraulic cylinder coupled to a speed valve is shown as line 104.

i. Cylinder Retraction

During cylinder retraction the jaw set of a demolition tool may move from a closed position to an open position. The boost component 12 and the speed component 14 may be inactive in the hydraulic device 10. The hydraulic cylinder 20 may function as a standard dual acting cylinder. Hydraulic fluid may flow to the rod-side chamber 24 of the hydraulic cylinder 20 and pressure may be applied on the piston 28 at the rod-side chamber 24.

The hydraulic cylinder 20 coupled with the hydraulic device 10 may have a smaller diameter than a hydraulic cylinder coupled to a speed valve. The smaller diameter of the hydraulic cylinder 20 may enable a higher velocity of hydraulic fluid flow during cylinder retraction, as a result of a smaller volume of the hydraulic cylinder 20, when the flow rate of the hydraulic fluid remains constant in the hydraulic cylinder 20 and in the hydraulic cylinder coupled to a speed valve. The jaw set of a demolition tool actuated by a hydraulic cylinder 20 coupled to the hydraulic device 10 may open in a shorter time as a result of the smaller cylinder volume.

The time for a jaw set of a demolition tool to fully open may be independent of a load presented by the material. The opening time may be dependent on the hydraulic cylinder and the components acting on the hydraulic cylinder. In FIG. 2 line 100 shows that the hydraulic cylinder 20 coupled to the hydraulic device 10 may be able to move from being fully closed (denoted by $P_1$) to fully open (denoted by $P_2$) in $t_1$-$t_0$ sec. Line 102 shows that the hydraulic cylinder coupled to the booster valve may be able to move in the same time, as the hydraulic cylinders have the same diameter size. Line 104 shows that the hydraulic cylinder coupled to the speed valve may be able to move from $P_1$ to $P_2$ in $t_5$-$t_0$ sec.

ii. Cylinder Extraction (Phase 1)

During cylinder extraction the jaw set of a demolition tool may move from an open position to a closed position. The booster component 12 may be deactivated and the speed component 14 may be activated in the hydraulic device 10. The hydraulic cylinder 20 may function under the speed mode. Hydraulic fluid may flow to the piston-side chamber 22 of the hydraulic cylinder 20 and pressure may be applied on the piston 28 at the piston-side chamber 22. Return flow of the hydraulic fluid from the rod-side chamber 24 may be redirected to the piston-side chamber 22 to increase velocity of cylinder extraction.

Return flow of the hydraulic fluid may be redirected as the hydraulic device 10 is subjected to a low to medium pressure. During this phase of cylinder extraction the jaw set which may contain the material to be worked, may not yet be subjected to the work load. As both jaws of a jaw set contact the material to be worked, the pressure in the hydraulic device 10 may spike (denoted by $P_3$).

The time for a jaw set of a demolition tool to move from $P_2$ to $P_3$ may be independent of a load of the material. The phase 1 time may be dependent on the hydraulic cylinder and the components acting on the hydraulic cylinder. In FIG. 2 line 100 shows that the hydraulic cylinder coupled to the hydraulic device 10 may be able to move from $P_2$ to $P_3$ in $t_2$-$t_1$ sec. Line 102 shows that the hydraulic cylinder coupled to the booster valve may be able to move from $P_2$ to $P_3$ in $t_3$-$t_1$ sec. Line 104 shows that the hydraulic cylinder coupled to the speed valve may be able to move from $P_2$ to $P_3$ in about $t_6$-$t_5$ sec.

iii. Cylinder Extraction (Phase 2)

The pressure in the hydraulic cylinder 20 may increase as the jaw set initiates work on the material. At a predetermined pressure value, the speed component 14 of the hydraulic device 10 may be deactivated and the booster component 12 remains inactive. The hydraulic cylinder 20 coupled to the hydraulic device 10 may transition from functioning under the speed mode to function as a standard dual acting cylinder.

Hydraulic fluid may flow to the piston-side chamber 22 of the hydraulic cylinder 20 and pressure may be applied on the piston 28 at the piston-side chamber 22. Return flow of the hydraulic fluid from the rod-side chamber 24 may flow to a fluid reservoir.

During this phase of cylinder extraction the jaw set which may contain the material to be worked, may be subjected to the work load as the jaw set initiates work on the material. As work on the material progresses, the pressure in the hydraulic device 10 may increase further.

The time for a jaw set of a demolition tool to move from $P_3$ (i.e. position of jaw at deactivation of speed component 14) to $P_4$ may be dependent on the load of the material, on the hydraulic cylinder and the components acting on the hydraulic cylinder. In FIG. 2 line 100 shows that the hydraulic cylinder 20 coupled to the hydraulic device 10 may be able to move from $P_3$ to $P_4$ in $t_4$-$t_2$ sec.

Line 102 and line 104 respectively show that the hydraulic cylinder coupled to the booster valve and the hydraulic cylinder coupled to the speed valve do not exhibit a phase 2 during cylinder extraction and instead transition directly from phase 1 to phase 3.

iv. Cylinder Extraction (Phase 3)

The pressure in the hydraulic cylinder 20 may increase as the jaw set continues work on the material. At a predetermined pressure value, the booster component 12 of the hydraulic device 10 may be activated and the speed component 14 remains inactive. The hydraulic cylinder 20 coupled to the hydraulic device 10 may transition from functioning as a standard dual acting cylinder to functioning under the boost mode.

Hydraulic fluid may flow to the piston-side chamber 22 of the hydraulic cylinder 20 and pressure may be applied on the piston 28 at the piston-side chamber 22. Hydraulic flow and pressure may be applied to the booster component 12 which increases the working pressure by a certain ratio. The ratio may depend on the relative diameters of the booster spool and the hydraulic cylinder 20. Return flow from the rod-side chamber 24 together with excess fluid flow from the booster component 12 may be redirected to the fluid reservoir.

During this phase of cylinder extraction the jaw set which may contain the material to be worked, may be subjected to the work load as the jaw set continues work on the material resulting in a further increase of pressure in the hydraulic device 10. The booster component 12 may increase the closing force of the jaw set to a maximum level.

The time for a jaw set of a demolition tool to move from $P_4$ (i.e. position of jaw set at activation of booster component 12) to $P_1$ (i.e. fully closed position of jaw set) may be dependent on the load of the material, on the hydraulic cylinder and the components acting on the hydraulic cylinder. In FIG. 2 line 100 shows that the hydraulic cylinder coupled to the hydraulic device 10 may be able to move from $P_4$ to $P_1$ in $t_7$-$t_4$ sec.

Line 102 and line 104 respectively show that the hydraulic cylinder coupled to the booster valve and the hydraulic cylinder coupled to the speed valve transition directly from phase 1 to phase 3. Line 102 shows that the hydraulic cylinder coupled to the booster valve may be able to move from $P_3$ to $P_1$ in $t_9$-$t_3$ sec. Line 104 shows that the hydraulic cylinder coupled to the speed valve may be able to move from $P_3$ to $P_1$ in about $t_8$-$t_6$ sec.

FIG. 2 indicates that the overall cycle time of line 100 is shorter than the respective cycle times of lines 102 and 104. Hence, the jaw set actuated by a hydraulic cylinder 20 coupled to the hydraulic device 10 may be able to open and close faster than jaws actuated by hydraulic cylinders coupled to a booster valve or a speed valve.

The skilled person would appreciate that foregoing embodiments may be modified to obtain the apparatus of the present disclosure.

INDUSTRIAL APPLICABILITY

This disclosure describes a hydraulic device 10 for cyclically operating a dual acting hydraulic cylinder 20.

The operation of the hydraulic device 10 may be used to operate a dual acting hydraulic cylinder 20 that actuates a demolition tool. The demolition tool may have a jaw set and may be used for crushing, cutting or pulverizing material. The hydraulic device 10 may improve the opening and closing times of the jaw set.

The hydraulic device 10 may enable the jaws to open rapidly in the retraction stroke of the hydraulic cylinder 20. Closing the jaw set in the extraction stroke of the hydraulic cylinder, the hydraulic device 10 may be switched to the speed mode to enable the jaws to close at a faster rate, up to the point the jaws come into contact with material present in the jaws. Contact of the jaws with the material may result in a pressure spike in the hydraulic device 10 causing the hydraulic device 10 to be switched to the normal mode. In the normal mode, the hydraulic device 10 may enable the hydraulic cylinder 20 to provide sufficient force to the jaws to crush, cut or pulverise the material. If a higher force is needed the hydraulic device 10 may be switched to the boost mode so that a high pressure may be sent to the hydraulic cylinder 20 to increase the crushing, cutting or pulverising force of the jaw.

The industrial applicability of the hydraulic device 10 as described herein will have been readily appreciated from the foregoing discussion.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

One skilled in the art will realize the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The invention claimed is:

1. A method of operating a dual acting hydraulic cylinder comprising
the steps of:
returning a hydraulic fluid from a rod-side chamber to a piston-side chamber of the cylinder during a start phase of cylinder extraction with a speed component; and
increasing a pressure of the hydraulic fluid during an end phase of cylinder extraction with a booster component, wherein the booster component increases the pressure of the hydraulic fluid being returned from the rod-side chamber to the piston-side chamber of the cylinder.

2. The method of claim 1, further comprising the step of increasing the pressure of the hydraulic fluid to the cylinder during a cylinder retraction phase with the booster component.

3. The method of claim 2, wherein the pressure of the hydraulic fluid is increased by the booster component at the rod-side chamber during the cylinder retraction phase.

4. The method of claim 1, further comprising a step of returning the hydraulic fluid from the rod-side chamber to a reservoir during an intermediate phase of cylinder extraction.

5. The method of claim 1, wherein the step of increasing the pressure of the hydraulic fluid during the end phase of cylinder extraction comprises increasing the pressure of the hydraulic fluid at the piston-side chamber by a ratio depending on relative diameters of a spool within a booster valve of the booster component.

6. The method of claim 1, wherein the transition between the start phase of cylinder extraction and the end phase of cylinder extraction is further controlled by a change in the hydraulic fluid pressure.

7. The method of claim 6, wherein the transition between the start phase of cylinder extraction and the end phase of cylinder extraction is further controlled by a change in a hydraulic fluid flow direction.

8. A hydraulic device for operating a dual acting hydraulic cylinder, comprising:
a speed component arranged to return a hydraulic fluid from a rod-side chamber to a piston-side chamber of the cylinder at a start phase of cylinder extraction; and
a booster component arranged to increase a pressure of the hydraulic fluid at an end phase of cylinder extraction, wherein the booster component increases the pressure of the hydraulic fluid being returned from the rod-side chamber to the piston-side chamber of the cylinder.

9. The device of claim 8, wherein the booster component is arranged to increase the pressure of the hydraulic fluid to the cylinder during a cylinder retraction phase.

10. The device of claim 9, wherein the booster component is arranged to increase the pressure of the hydraulic fluid flowing to the rod-side chamber during the cylinder retraction phase.

11. The device of claim 8, wherein the booster component is arranged to increase the pressure of the hydraulic fluid at the piston-side chamber during a start phase of cylinder retraction.

12. The device of claim 8, wherein the speed component and the booster component are arranged to be inactive at an intermediate phase of cylinder extraction.

13. The device of claim 8, further configured to transition between the start phase of cylinder extraction and the end phase of cylinder extraction under a control of the pressure of the hydraulic fluid.

14. The device of claim 13, further configured to transition between the start phase of cylinder extraction and the end phase of cylinder extraction under further control of a hydraulic fluid flow direction.

15. A demolition tool, comprising:
a hydraulic cylinder configured to actuate the demolition tool;
a device for operating a dual acting hydraulic cylinder;
a coupling mechanism;
the coupling mechanism configured to connect the hydraulic cylinder and the device;
a speed component located within the device;
the speed component arranged to return a hydraulic fluid from a rod-side chamber to a piston-side chamber of the dual acting hydraulic cylinder at a start phase of cylinder extraction;
a booster component located within the device;
the booster component arranged to increase a pressure of the hydraulic fluid at an end phase of cylinder extraction, wherein the booster component increases the pressure of the hydraulic fluid being returned from the rod-side chamber to the piston-side chamber of the cylinder.

16. The demolition tool of claim 15, wherein the booster component is arranged to increase the pressure of the hydraulic fluid during a cylinder retraction phase.

17. The demolition tool of claim 16, wherein the booster component is arranged to increase the pressure of the hydraulic fluid flowing to the rod-side chamber during the cylinder retraction phase.

18. The demolition tool of claim 15, wherein the booster component is arranged to increase the pressure of the hydraulic fluid at the piston-side chamber during a start phase of cylinder retraction.

19. The demolition tool of claim 15, wherein the device is configured to transition between the start phase of cylinder extraction and the end phase of cylinder extraction under a control of the hydraulic fluid pressure.

20. The demolition tool of claim 15, wherein the device is configured to transition between the start phase of cylinder extraction and the end phase of cylinder extraction under further control of a hydraulic fluid flow direction.

* * * * *